US012625599B2

(12) United States Patent
Chen

(10) Patent No.: US 12,625,599 B2
(45) Date of Patent: May 12, 2026

(54) CROSS-PROCESS INFORMATION PROCESSING METHOD, AND CONTROLLER, TERMINAL AND STORAGE MEDIUM

(71) Applicant: ZTE CORPORATION, Shenzhen (CN)

(72) Inventor: Penghui Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 203 days.

(21) Appl. No.: 18/552,512

(22) PCT Filed: Apr. 6, 2022

(86) PCT No.: PCT/CN2022/085383
§ 371 (c)(1),
(2) Date: Sep. 26, 2023

(87) PCT Pub. No.: WO2022/247473
PCT Pub. Date: Dec. 1, 2022

(65) Prior Publication Data
US 2024/0176473 A1 May 30, 2024

(30) Foreign Application Priority Data
May 24, 2021 (CN) .......................... 202110565032.6

(51) Int. Cl.
G06F 3/04842 (2022.01)
G06F 3/0481 (2022.01)
G06F 9/451 (2018.01)

(52) U.S. Cl.
CPC ........ G06F 3/04842 (2013.01); G06F 3/0481 (2013.01); G06F 9/451 (2018.02)

(58) Field of Classification Search
CPC ..... G06F 3/04842; G06F 3/0481; G06F 9/451
See application file for complete search history.

(56) References Cited

U.S. PATENT DOCUMENTS

2011/0055742 A1    3/2011   Tomono
2013/0050119 A1*   2/2013   Nemoto ................ G06F 3/0482
                                                 715/810
(Continued)

FOREIGN PATENT DOCUMENTS

CN        103488379 A      1/2014
CN        105224337 A      1/2016
(Continued)

OTHER PUBLICATIONS

"Moxiang take you to learn Launcher (VI)—Dragging," <<https://juejin.cn/post/6844903454570184718>>.
International Searching Authority. International Search Report and Written Opinion for PCT Application No. PCT/CN2022/085383 and English translation, mailed Jun. 15, 2022, pp. 1-11.
The State Intellectual Property Office of People's Republic of China. First Office Action for CN Application No. 2021105650326 and English translation, mailed Feb. 3, 2023, pp. 1-7.
(Continued)

*Primary Examiner* — Mahelet Shiberou
(74) *Attorney, Agent, or Firm* — Vivacqua Crane, PLLC

(57) ABSTRACT

A cross-process information processing method, and a controller, a terminal and a storage medium are disclosed. The method may include receiving an element selection instruction for selection of a target element in a first process in a current display interface; generating a displaceable view that may include the target element according to the element selection instruction, where the displaceable view is for subsequent displacement and placement; switching the current display interface to a target display interface carrying a second process; and receiving a view displacement instruction, and displacing the displaceable view into the second process according to the view displacement instruction.

18 Claims, 6 Drawing Sheets

Receive an operation trigger instruction that instructs a displacement of the displaceable view ⟋⟍ S810

Trigger the second process, and switch the current display interface to the target display interface carrying the second process, in response to a displacement of the displaceable view to the preset position in the current display interface ⟋⟍ S820

(56) References Cited

U.S. PATENT DOCUMENTS

| | | | |
|---|---|---|---|
| 2013/0154978 A1 | 6/2013 | Kim et al. | |
| 2015/0128051 A1 | 5/2015 | Strain et al. | |
| 2023/0176719 A1* | 6/2023 | Rogers | H04L 67/02 |
| | | | 715/763 |
| 2024/0053879 A1* | 2/2024 | Wang | G09G 5/14 |

FOREIGN PATENT DOCUMENTS

| | | |
|---|---|---|
| CN | 108595237 A | 9/2018 |
| CN | 108664182 A | 10/2018 |
| CN | 109426408 A | 3/2019 |
| CN | 110088719 A | 8/2019 |
| CN | 110221759 A | 9/2019 |
| CN | 110333814 A | 10/2019 |
| CN | 112667410 A | 4/2021 |
| CN | 112698763 A | 4/2021 |
| CN | 113157468 A | 7/2021 |
| JP | 2011048538 A | 3/2011 |
| JP | 2013127794 A | 6/2013 |
| KR | 20130070090 A | 6/2013 |
| KR | 20130132178 A | 12/2013 |
| WO | 2019071854 A1 | 4/2019 |

OTHER PUBLICATIONS

The State Intellectual Property Office of People's Republic of China. First Search Report for CN Application No. 2021105650326 and English translation, mailed Jan. 30, 2023, pp. 1-5.

The State Intellectual Property Office of People's Republic of China. Second Office Action for CN Application No. 2021105650326 and English translation, mailed May 9, 2023, pp. 1-10.

European Patent Office. Extended European Search Report for EP Application No. 22810206.7, mailed Oct. 10, 2024, pp. 1-9.

Japan Patent Office. Notice of Reasons for Refusal for JP Application No. 2023-558260 and English translation, mailed Oct. 18, 2024, pp. 1-8.

Samsung. "Basic operations, Galaxy Z Flip 5G SCV47 / SCG04 User Guide" and English translation, Samsung Electronics Co., Ltd., 2021, pp. 1-179.

Intellectual Property India. Examination Report for IN Application No. 202127005310 and English translation, mailed May 5, 2025, pp. 1-7.

Korean Intellectual Property Office. First Office Action for KR Application No. 10-2023-7031410 and English translation, mailed May 7, 2025, pp. 1-12.

* cited by examiner

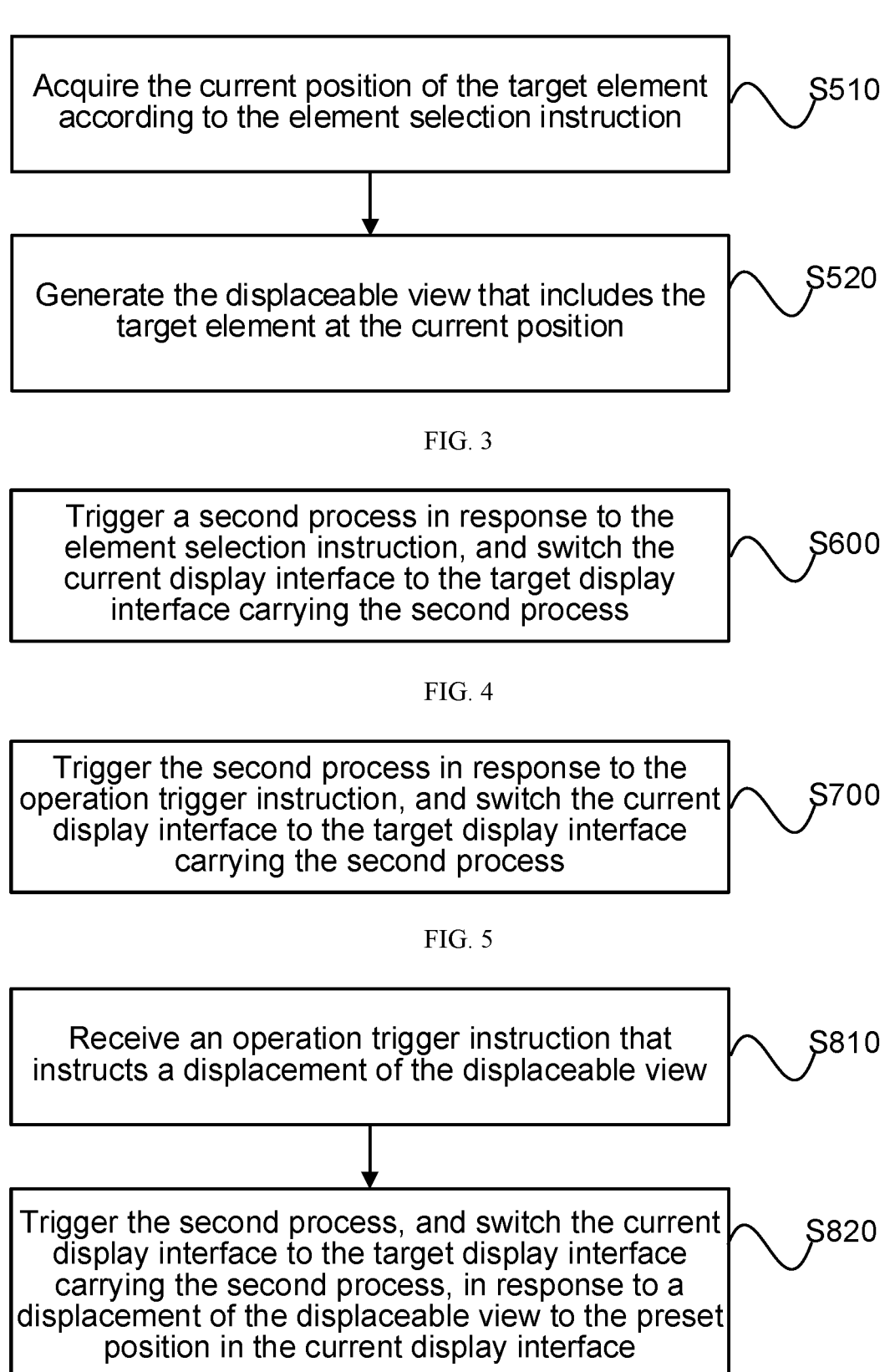

Acquire the current position of the target element according to the element selection instruction ～ S510

Generate the displaceable view that includes the target element at the current position ～ S520

FIG. 3

Trigger a second process in response to the element selection instruction, and switch the current display interface to the target display interface carrying the second process ～ S600

FIG. 4

Trigger the second process in response to the operation trigger instruction, and switch the current display interface to the target display interface carrying the second process ～ S700

FIG. 5

Receive an operation trigger instruction that instructs a displacement of the displaceable view ～ S810

Trigger the second process, and switch the current display interface to the target display interface carrying the second process, in response to a displacement of the displaceable view to the preset position in the current display interface ～ S820

FIG. 6

Displace the displaceable view to the target position corresponding to the target position information according to the view displacement instruction ∽S900

FIG. 7

Displace the displaceable view to the second process in a floating display mode according to the view displacement instruction, and display the displaceable view in the second process as a widget after the view displacement instruction is completed ∽S1000

FIG. 8

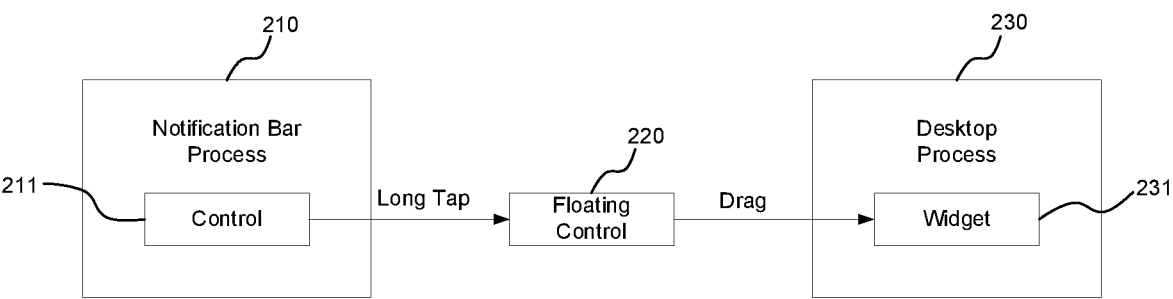

FIG. 9

CROSS-PROCESS INFORMATION PROCESSING METHOD, AND CONTROLLER, TERMINAL AND STORAGE MEDIUM

CROSS-REFERENCE TO RELATED APPLICATION

This application is a national stage filing under 35 U.S.C. § 371 of international application number PCT/CN2022/085383, filed Apr. 6, 2022, which claims priority to Chinese patent application 202110565032.6 filed May 24, 2021. The contents of these applications are incorporated herein by reference in their entirety.

TECHNICAL FIELD

The present disclosure relates to but is not limited to the technical field of computers, in particular to a method for processing information across processes, a controller, a terminal device, and a computer-readable storage medium.

BACKGROUND

For the current terminal devices, information is typically shown in the notification bar message management, in the short message, in the conversation box of the third-party application, in the swipe left screen with card information, and so on. Therefore, due to the above-mentioned various display modes, various kinds of information are often displayed in a complicated way, which makes it inconvenient for users to read and find the required information.

SUMMARY

The following is a summary of the subject matter described herein. This summary is not intended to limit the scope of protection of the claims.

Provided are a method for processing information across processes, a controller, a terminal device, and a computer-readable storage medium in some embodiments of the present disclosure.

An embodiment of the present disclosure provides a method for processing information across processes, which is applied to a terminal device, the method may include, receiving an element selection instruction for selection of a target element in a first process in a current display interface; generating a displaceable view for subsequent displacement that includes the target element according to the element selection instruction; switching the current display interface to a target display interface carrying a second process; and receiving a view displacement instruction, and displacing the displaceable view to the second process according to the view displacement instruction.

An embodiment of the present disclosure provides a controller, which may include a memory, a processor and a computer program stored in the memory and executable by the processor which, when executed by the processor causes the processor to carry out the method as described above.

An embodiment of the present disclosure provides a terminal device, which may include the controller as described above.

An embodiment of the present disclosure further provides a computer-readable storage medium storing thereon a computer-executable instruction which, when executed by a processor, causes the processor to carry out the method as described above.

Other features and advantages of the present disclosure will be illustrated in the following description, and in part will be apparent from the description, or may be understood by practicing the present disclosure. The objects and other advantages of the present disclosure can be achieved and obtained by the structure particularly set forth in the description, claims and drawings.

BRIEF DESCRIPTION OF DRAWINGS

The drawings are intended to provide a further understanding of the technical scheme of the present disclosure, and constitute a part of the specification, and they are intended to illustrate the technical scheme of the present disclosure in conjunction with the embodiments of the present disclosure, but are not intended to limit the technical scheme of the present disclosure.

FIG. 3 depicts a flowchart showing a generation of a displaceable view at a target element position in a method for processing information across processes according to an embodiment of the present disclosure;

FIG. 4 depicts a flowchart showing the switching from the current display interface to the target display interface in a method for processing information across processes according to another embodiment of the present disclosure;

FIG. 5 depicts a flowchart showing the switching from the current display interface to the target display interface in a method for processing information across processes according to another embodiment of the present disclosure;

FIG. 6 depicts a flowchart showing the switching from the current display interface to the target display interface according to an operation trigger instruction in a method for processing information across processes according to an embodiment of the present disclosure;

FIG. 7 depicts a flowchart showing the displacement of the displaceable view in a method for processing information across processes according to an embodiment of the present disclosure;

FIG. 8 depicts a flowchart showing the displacement of the displaceable view to the second process in a floating display mode and display of the view in the second process in a widget display mode after the displacement is completed, according to an embodiment of the present disclosure;

FIG. 9 depicts a schematic diagram showing a framework for displacing a target element in a notification bar process to a desktop process according to an embodiment of the present disclosure;

DETAILED DESCRIPTION

The purpose, technical scheme and advantages of the present disclosure will become apparent through the following description for various embodiments in conjunction with the drawings. It should be understood that the embodiments described here are intended for illustration but not limitation to the present disclosure.

It should be noted that although the devices are shown with individual functional modules in the schematic diagram and the logical sequences are shown in the flow chart, in some cases, the devices can have different modules than those shown and the steps can be executed in a different order than those shown. The terms "first" and "second", if used in the description, claims and drawings are intended to distinguish similar objects, and do not necessarily imply any specific order or sequence.

For the current terminal device that operates an Android system, information is typically shown in the notification bar message management, in the short message, in the conversation box of the third-party application, in the swipe left screen with card information, and so on. Therefore, due to the above-mentioned various display modes, various kinds of information are often displayed in a complicated way, which makes it inconvenient for users to read and find the required information.

In view of the above situation, there is provided a method for processing information across processes, a controller, a terminal device, and a computer-readable storage medium in some embodiments of the present disclosure. An embodiment of the present disclosure provides a method for processing information across processes, which is applied to a terminal device, the method includes but is not limited to, receiving an element selection instruction for selection of a target element in a first process in a current display interface; generating a displaceable view for subsequent displacement that includes the target element according to the element selection instruction; switching the current display interface to a target display interface carrying a second process; and receiving a view displacement instruction, and displacing the displaceable view to the second process according to the view displacement instruction. According to the technical scheme of an embodiment of the present disclosure, a user can display various target elements required by the first process altogether in the same second process, so that the user can simply read and find the desired information in the same second process, and the convenience for the user to read and find information is improved.

Some embodiments of the present disclosure will be further illustrated with reference to the drawings.

Figure 1:
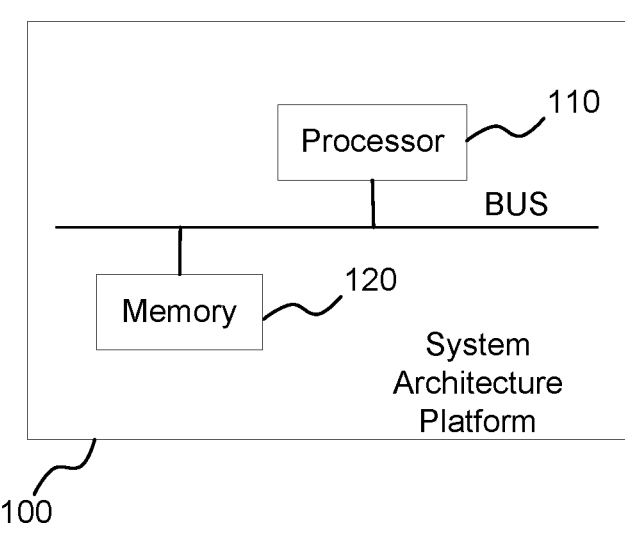
FIG. 1 depicts a schematic diagram showing a system architecture platform in which a method for processing information across processes according to an embodiment of the present disclosure is carried out.

As shown in FIG. 1 which depicts a schematic diagram showing a system architecture platform 100 in which a method for processing information across processes according to an embodiment of the present disclosure is performed.

In the embodiment shown in FIG. 1, the system architecture platform 100 is provided with a processor 110 and a memory 120 connected by a bus or other means. The connection is shown as bus by way of an example in FIG. 1.

As a non-transitory computer-readable storage medium, the memory 120 can be configured to store non-transitory software programs and non-transitory computer-executable programs. In addition, the memory 120 can include high-speed random-access memory and non-transitory memory, such as at least one disk memory device, flash memory device, or other non-transitory solid-state memory devices. In some embodiments, the memory 120 may include the memory 120 remotely arranged with respect to the processor 110, and the remote memory may be connected to the system architecture platform through a network. Examples of the above networks include, but are not limited to, the Internet, intranet, local area network, mobile communication network, and combinations thereof.

It can be understood by those having ordinary skills in the art that the system architecture platform can be applied to 3G communication network system, LTE communication network system, 5G communication network system, or subsequently evolved mobile communication network systems, etc. This embodiment is not limited thereto.

It can be understood by those having ordinary skills in the art that the system architecture platform shown in FIG. 1 does not constitute a limitation to the embodiment of the present disclosure, and may include more or fewer components than those shown, or some components may be combined, or have different component arrangements.

In the system architecture platform shown in FIG. 1, the processor 110 can call the program for processing information across processes stored in the memory 120, to perform the method for processing information across processes.

Based on the above system architecture platform, various embodiments of the method for processing information across processes of the present disclosure are proposed below.

Figure 2:
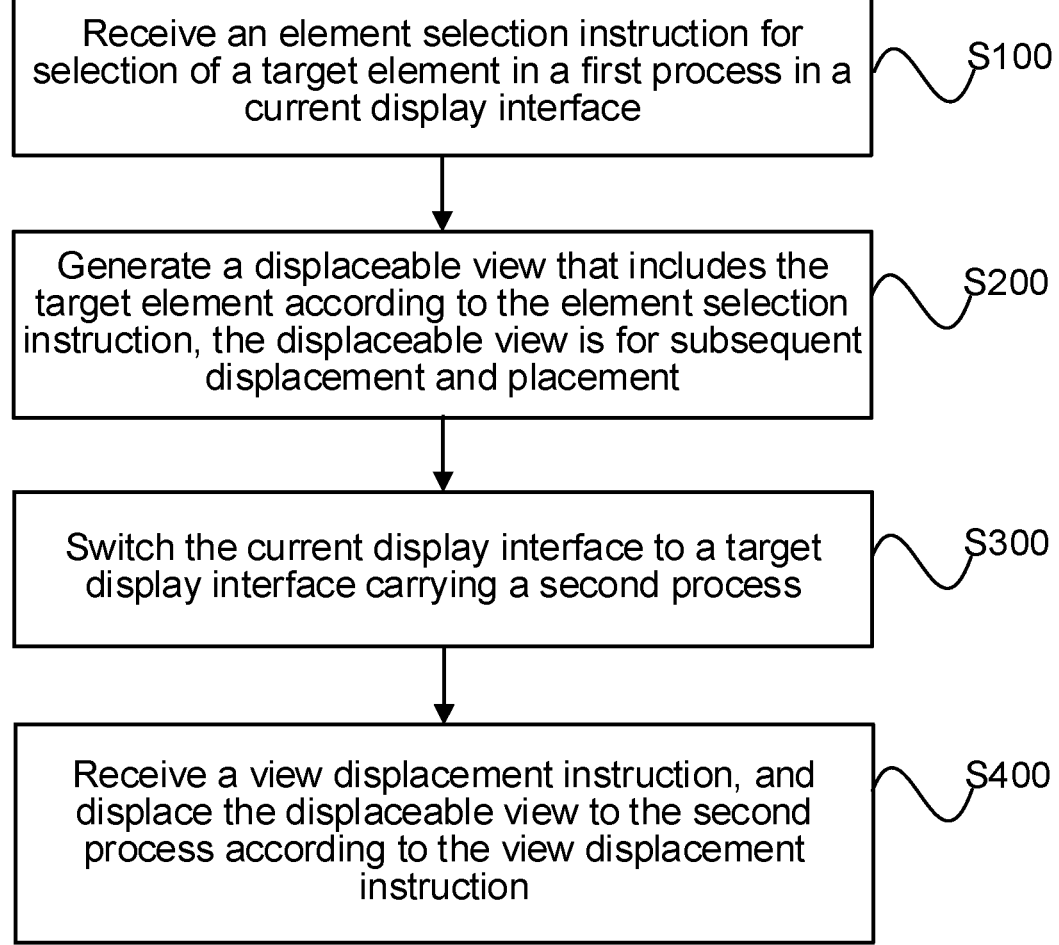
FIG. 2 depicts a flowchart showing a method for processing information across processes according to an embodiment of the present disclosure.

FIG. 2 depicts a flowchart showing a method for processing information across processes according to an embodiment of the present disclosure. The method is applied to a terminal device, and includes but is not limited to operations S100, S200, S300, and S400.

At S100, an element selection instruction for selection of a target element in a first process in a current display interface, is received.

At S200, a displaceable view that includes the target element is generated according to the element selection instruction, the displaceable view is for subsequent displacement.

At S300, the current display interface is switched to a target display interface carrying a second process.

At S400, a view displacement instruction is received, and the displaceable view is displaced to the second process according to the view displacement instruction.

In particular, the terminal device receives an element selection instruction for selection of the target element in the first process shown in the current display interface. Then the terminal device generates a displaceable view carrying the target element according to the element selection instruction, and the displaceable view is for subsequent displacement. The terminal device switches the current display interface to the target display interface carrying the second process. Eventually, the terminal device receives the view displacement instruction and displaces the displaceable view to the second process according to the view displacement instruction. According to the technical scheme of an embodiment of the present disclosure, a user can display various target elements required by the first process altogether in the same second process, so that the user can simply read and find the desired information in the same second process, and the convenience for the user to read and find information is improved.

It shall be noted that the above-described process can refer to a process including a notification message, or a process including an application icon. The method for processing information across processes according to an embodiment of the present disclosure classifies the above processes into a first process and a second process. The first process includes but is not limited to a notification bar process, a swipe left screen process, a short message process, a contact information process, a gallery process, or a third-party application process. The second process includes but is not limited to, a desktop process, a swipe left screen process, or a lock screen process. It should be noted that during the implementation of the method for processing information across processes according to an embodiment of the present disclosure, the first process and the second process are different application processes.

In particular, when the second process is a desktop process or a lock screen process, the first process is a notification bar process, a swipe left screen process, a short message process, a contact information process, a gallery process, or a third-party application process. Alternatively, when the second process is a swipe left screen process, the first process is a notification bar process, a short message process, a contact information process, a gallery process, or a third-party application process.

For example, when the second process is a desktop process, the user can quickly displace the desired element in the notification bar process, swipe left screen process, short message process, contact information process, gallery process, or third-party application process to the desktop process. Due to the frequent switching to the desktop process during the use of terminal device, the user can display the desired target elements in other processes altogether in the desktop process, so that the user can quickly read and find the desired information in the desktop process to which the user frequently switches, and the convenience for the user to read and find information is improved.

In addition, in some cases, the only contents that can be displayed on the existing desktop process are desktop icons and application widgets, and application widgets can be added from the widget list of the desktop process, or added after the application request pops up an add window and then operates in the pop-up window. In particular, the adding of widgets from the list of desktop processes is so limited that, the user can only select a content from the list and add the content for display, if another content is to be added, another selection is needed, which is not convenient for the user to place the content at any time they have already read directly into the desktop process to display. And at least three user's operations are required to add a widget in other application pop-ups. Therefore, in some cases, the process of adding widgets to a desktop process is relatively complicated.

In contrast, the method for processing information across processes according to various embodiments of the present disclosure can enable a user interaction in which a user is allowed to drag content to the desktop across processes, and realize the display method in which the content of any page is displaced to the desktop and displayed as a widget based on the widget function of the Android system. The method for processing information across processes according to various embodiments of the present disclosure enables a user to directly select favorite content, displace content to the desktop, and display the content as a widget to the user. Moreover, the method for processing information across processes according to various embodiments of the present disclosure can reduce user operations, improve user experience, enrich information displayed on the desktop process, and improve message management.

It is to be noted that some systems, such as the Android system, do not support the displacement of an element away from the process where the element is located. That is, the Android system does not support the operation of displacement of elements from one process to another. In order to solve this problem, a method for processing information across processes is provided in some embodiments of the present disclosure, which can provide an element displacement scheme on the premise that the system does not support displacement of elements to leave the process to which they belong. In particular, in an embodiment of the present disclosure, after an element selection instruction is received, a "makeup" content for subsequent display on the first process, where the "makeup" content refers to a displaceable view for subsequent displacement that carries the target element, so that the drag of the target element in the first process can be visually shown. It should be noted that the displaceable view for subsequent displacement can be generated by the second process, and the user can displace the view into the second process since the view belongs to the second process.

It should be noted that in order to show to a user that the displaceable view is a target element in the first process on the premise that the system does not support displacement of the target element away from the first process, the displaceable view in an embodiment of the present disclosure carries a screenshot information corresponding to the target element. Since the displaceable view carries the screenshot information corresponding to the target element, the content displayed by the view is the same as the selected target element, so that the user can have the illusion and perceive that the displaceable view that is displaced is the target element in the first process.

It is to be noted that the first process and the second process are not shown on the same display interface. The present disclosure can solve the problem that the elements of the notification bar process and the desktop process cannot be shown on the same display interface, and allows the displacement of elements from the notification bar process to the desktop process, which is greatly different from the situation that the first process and the second process are shown on the same screen spontaneously.

It should be noted that after the displaceable view is displaced to the second process, in order to enable users to view the detailed information in the view in the second process, the view further carries data information corresponding to the target element. For example, the data information can be source data, and users can directly read the source data. Alternatively, the data information can also be related data in a preset format. When the user needs to read the target element, the terminal device analyzes the related data to obtain the source data, so that the user can read the source data corresponding to the target element. Alternatively, the data information can also be source data path information. When the user needs to read the target element, the terminal device finds the source data corresponding to the target element according to the source data path information, so that the user can read the source data corresponding to the target element.

It can be understood that when the user reads the displaceable view in the second process, the terminal device can directly display the content of the view in the second process, or jump to other processes to display the content of the view.

It can be understood that the displaceable view for subsequent displacement can be a floating display view. In particular, when receiving the element selection instruction, the terminal device generates a page with a transparent background, and displays a floating display layer (i.e., the floating display view) consistent with the content of the target element on this page according to the location and screenshot of the target element.

It should be noted that the above target element includes but is not limited to, at least one of, a text element, a voice element, an image element, or a video element. For example, the target element can be a text element in the notification bar process, i.e., the text information in the notification bar process. Alternatively, the target element can also be a text element in the gallery process, i.e., the text information in the gallery process. Alternatively, the target elements can also be a voice element or a video element in the third-party application process, i.e., voice information and video information in the third-party application process.

It should be noted that the above-mentioned element selection instruction can be one of, a click operation instruction at the target element position, a slide operation instruction at the target element position, a voice operation instruction, a long tap operation instruction issued by a long tap with a duration that exceeds a preset time at the target element position, a click operation instruction at the target element position with a click frequency that exceeds a preset click frequency, or a trigger instruction with a trigger condition that the target element includes preset keyword information. For example, when the element selection instruction is a long tap operation instruction issued by a long tap with a duration that exceeds a preset time at the target element position, the element selection instruction is issued by a user through a long tap at the target element position. In such a case, the terminal device will generate a displaceable view for subsequent displacement carrying the target element according to the long tap instruction. For another example, when the element selection instruction is a trigger instruction with a trigger condition that the target element includes preset keyword information, and if the target element includes keyword information preset by the user according to his/her preferences, then the terminal device will automatically trigger the element selection instruction to select the target element.

In addition, it should be noted that the above-described view displacement instruction can be one of, a drag and move operation instruction, a key-pressing and move operation instruction, or a voice operation instruction. For example, when the view displacement instruction is a drag and move operation instruction, the terminal device receives a user's drag and move operation instruction at the position of the displaceable view for subsequent displacement, and then moves the displaceable view to the second process along the drag trajectory according to the drag and move operation instruction. For another example, when the view displacement instruction is a key-pressing and move operation instruction, the terminal device receives a user's key-pressing and move operation instruction on a physical moving key or a virtual moving key, and then moves the displaceable view to the second process step by step according to the key-pressing and move operation instruction, where the above-described physical moving key or virtual moving key refers to the moving key for up, down, left, or right movement.

FIG. 3 depicts a flowchart showing a generation of a displaceable view at a target element position in a method for processing information across processes according to an embodiment of the present disclosure. S200 as described above includes but is not limited to operations S510 and S520.

At S510, the current position of the target element is acquired according to the element selection instruction.

At S520, a displaceable view that includes the target element is generated at the current position, the displaceable view is for subsequent displacement.

In particular, after receiving the element selection instruction, the terminal device acquires the current position of the target element corresponding to the element selection instruction according to the element selection instruction. Then the terminal device generates a view for subsequent displacement carrying the target element at the current position.

In an embodiment, the switching of the current display interface to the target display interface carrying the second process in the above-described operation S300 may include, but is not limited to, the operations described in conjunction with FIG. 4 or FIG. 5 below. FIG. 4 depicts a flowchart showing the switching from the current display interface to the target display interface in a method for processing information across processes according to an embodiment of the present disclosure. FIG. 5 depicts a flowchart showing the switching from the current display interface to the target display interface in a method for processing information across processes according to another embodiment of the present disclosure.

As shown in FIG. 4, which depicts a flowchart showing the switching from the current display interface to the target display interface in a method for processing information across processes according to an embodiment of the present disclosure. The switching from the current display interface to the target display interface carrying the second process described in S300 may include, but is not limited to, operation S600.

At S600, a second process is triggered in response to the element selection instruction, and the current display interface is switched to the target display interface carrying the second process.

In particular, after receiving the element selection instruction, the terminal device not only generates a view for subsequent displacement carrying the target element according to the element selection instruction, but also directly triggers the second process according to the element selection instruction, and switches the current display interface to the target display interface carrying the second process. Based on this, the element selection instruction in an embodiment of the present disclosure not only triggers terminal device to generate the view for subsequent displacement, but also triggers the terminal device to switch the current display interface to the target display interface, and the operation is simple and quick.

FIG. 5 depicts a flowchart showing the switching from the current display interface to the target display interface in the method for processing information across processes according to another embodiment of the present disclosure. The switching from the current display interface to the target display interface carrying the second process described in S300 may include, but is not limited to, operation S700.

At S700, the second process is triggered in response to the operation trigger instruction, and the current display interface is switched to the target display interface carrying the second process.

The technical scheme described in FIG. 5 can be applied in an embodiment of the present disclosure as an alternative to the technical scheme described in FIG. 4. In particular, after receiving the element selection instruction, the terminal device generates a displaceable view for subsequent displacement carrying the target element according to the element selection instruction. Subsequently, the terminal device will not trigger the second process and will not switch the current display interface to the target display interface carrying the second process unless receiving the operation trigger instruction. On this basis, two distinct instructions are provided in an embodiment of the present disclosure, i.e., the instruction that triggers the terminal device to generate the displaceable view for subsequent displacement and placement, and the instruction that triggers the terminal device to switch from the current display interface to the target display interface. Here, the element selection instruction is utilized to trigger the terminal device to generate the displaceable view for subsequent displacement and placement, and the operation trigger instruction is utilized to trigger the terminal device to switch from the current display interface to the target display interface. Therefore, the technical scheme described in FIG. 5 can be applied in an embodiment of the present disclosure as an alternative to the technical scheme described in FIG. 4, to also achieve the switching of the current display interface to the target display interface.

FIG. 6 depicts a flowchart showing the switching from the current display interface to the target display interface in the method for processing information across processes according to the operation trigger instruction according to an embodiment of the present disclosure. The above-described S700 may include, but is not limited to, operations S810 and S820.

At S810, an operation trigger instruction that instructs a displacement of the displaceable view is received.

At S820, the second process is triggered, and the current display interface is switched to the target display interface carrying the second process, in response to a displacement of the displaceable view to the preset position in the current display interface.

In particular, after receiving the element selection instruction, the terminal device generates a displaceable view for subsequent displacement carrying the target element according to the element selection instruction. Then, after receiving the operation trigger instruction for displacing the displaceable view from the user, the displaceable view is displaced according to the user's operation trigger instruction. When the displaceable view is displaced to the preset position in the current display interface, the terminal device triggers the second process and switches the current display interface to the target display interface carrying the second process.

It can be understood that the preset position can be the edge position of the current display interface, in particular, the top edge position, bottom edge position, left edge position, or right edge position of the current display interface.

For example, the switching from the current display interface to the target display interface can also be carried out by a touch operation. In particular, after the displaceable view is displayed floating, the user can drag the view to an edge position of the current display interface with his/her finger to trigger the terminal device to switch the current display interface to the target display interface.

FIG. 7 depicts a flowchart showing the displacement of the displaceable view to the second process in the method for processing information across processes according to an embodiment of the present disclosure. When the view displacement instruction carries the target position information in the second process, the displacement of the displaceable view to the second process according to the view displacement instruction described in the above operation S400 includes but is not limited to operation S900.

At S900, the displaceable view is displaced to the target position corresponding to the target position information according to the view displacement instruction.

In particular, since the view displacement instruction carries the target position information in the second process, and thus, after receiving the view displacement instruction, the terminal device displaces the displaceable view to the target position corresponding to the target position information according to the view displacement instruction. The first and second scenarios will be illustrated by way of non-limiting illustrations below for the displacement of the displaceable view for placement to the target position corresponding to the target position information.

Scenario One: when the target position is a blank position in the second process, that is, when the target position is free and no element of the second process has been already placed thereon, the displaceable view will be directly placed at the target position after the displacement.

Scenario Two: when the target position is a non-blank position in the second process, that is, when an original element of the second process has been placed at the target position, the terminal device recognizes that the target position where the displaceable view is to be placed, is currently occupied by the original element, then the terminal device displaces the displaceable view at a blank position near the target position. Alternatively, the terminal device displaces the original element to a nearby blank position so that the displaceable view can be displaced and placed at the target position.

For example, when the view displacement instruction is a drag and move instruction, according to an initial position, a drag trajectory, and a target position contained in the drag and move instruction, the terminal device displaces the displaceable view from the initial position to the target position along the drag trajectory according to the drag and move instruction.

FIG. 8 depicts a flowchart showing the displacement of the displaceable view for subsequent placement to the second process in a floating display mode and display of the view in the second process in a widget display mode after the displacement is completed, according to an embodiment of the present disclosure. The displacement of the displaceable view for subsequent placement to the second process according to the view displacement instruction described in operation S400 includes but is not limited to operation S1000.

At S1000, the displaceable view is displaced to the second process in a floating display mode according to the view displacement instruction, and the displaceable view is displayed in the second process as a widget after the view displacement instruction is completed.

In particular, during the drag and move operation of the displaceable view, the view is displaced while floating. Once the drag and move operation is completed, the view is displayed in the second process as a widget, such as a widget in the desktop process.

Some implementations are provided based on the method for processing information across processes described in conjunction with FIGS. 2 to 8.

FIG. 9 depicts a schematic diagram showing a framework for the displacement of a target element in a notification bar process to a desktop process according to an embodiment of the present disclosure where the first process is a notification bar process and the second process is a desktop process.

In particular, the control 211 in the notification bar process 210 in FIG. 9 refers to the carrier of displayed content, the floating control 220 refers to the carrier of the displaceable view for subsequent placement, and the widget 231 in the desktop process 230 is a form of other applications displayed content on the desktop.

In order to displace the target element from the notification bar process to the desktop process, generally the following operations are carried out.

First, long tap control logic and widget display logic are implemented according to the Android specification. For example, the control displayed by the notification bar process implements the onLongClick ( ) method, and the notification bar process inherits AppWidgetProvider to implement a widget display logic. Based on the above settings, the control in the notification bar process can be triggered through a long tap by a user. For the same reason, the displaceable view for subsequent placement can be displayed on the desktop process in the form of a widget.

Then, by a long tap of the control in the notification bar process, the system is called to add the widget logic, and some parameters can be transferred into the bundle, such as the screenshot information of the long tap control and the current position information of the control on the screen. For example, the transfer method of the current position information of the long tap control on the screen can be but is not limited to: bundle.putIntArray("location", location). And the transfer method of the screenshot information of the long tap control described above can be but is not limited to: bundle. Putparcelable (AppWidgetManager. EXTRA_APPWID-GET_PREVIEW, views). Then AppWidgetManager.requestPinAppWidget(componentName, bundle, null) is called to request adding widgets.

Then, when receiving the request to add widgets, the desktop process creates a page with a transparent background. The terminal device then displays a floating display layer consistent with the content of the long tap control according to the obtained current position information and the screenshot information. The attribute of the page with a transparent background is set to FLAG_SLIPPERY. For example, the terminal device displays a floating display layer. Moreover, the framework modifies the code of Input-Dispatcher.cpp so that touch events can be transferred between two processes. The specific logic can be as follows. After a long tap on the control, the current TouchWindow list is null due to the exit of the original window, and then the touch event is transferred to the window where the touch point is located, i.e., the floating display layer. Then the floating display layer starts to handle the touch event and exits to the desktop process.

Finally, since the floating display layer and the desktop are in the same process, or it can be considered that the floating display layer belongs to the desktop process, the drag event can be handled. Once dragging starts, the desktop can move the displaceable view according to the drag trajectory and place the target element at a proper position in the desktop process, where the displaceable view can be displayed on the desktop process as a widget.

According to the technical scheme of an embodiment of the present disclosure, a user can display desired target elements in the notification bar process in the desktop process, so that the user can simply read and find the desired information in the desktop process, and the convenience for the user to read and find information is improved.

Based on the above method for processing information across processes, there will be interactive changes between the user and the human-machine interface during the implementation of the method, as follows. The user first performs a long tap operation on the target element of interest in the first process. The terminal device then displays the selected target element in floating on the current display interface. At this time, the terminal device also switches the current display interface to the desktop. The user can start dragging the floating target element on the desktop and place the floating target element on the desktop as a widget when dragging or other touch methods are stopped.

It can be understood that in other embodiments, the switching from the current display interface to the desktop can also be done by a touch operation. For example, after the selected object is displayed floating, the user can slide the selected object to an edge of the current display interface through the finger of the user to trigger the switching of the current display interface to the desktop.

Figure 10:
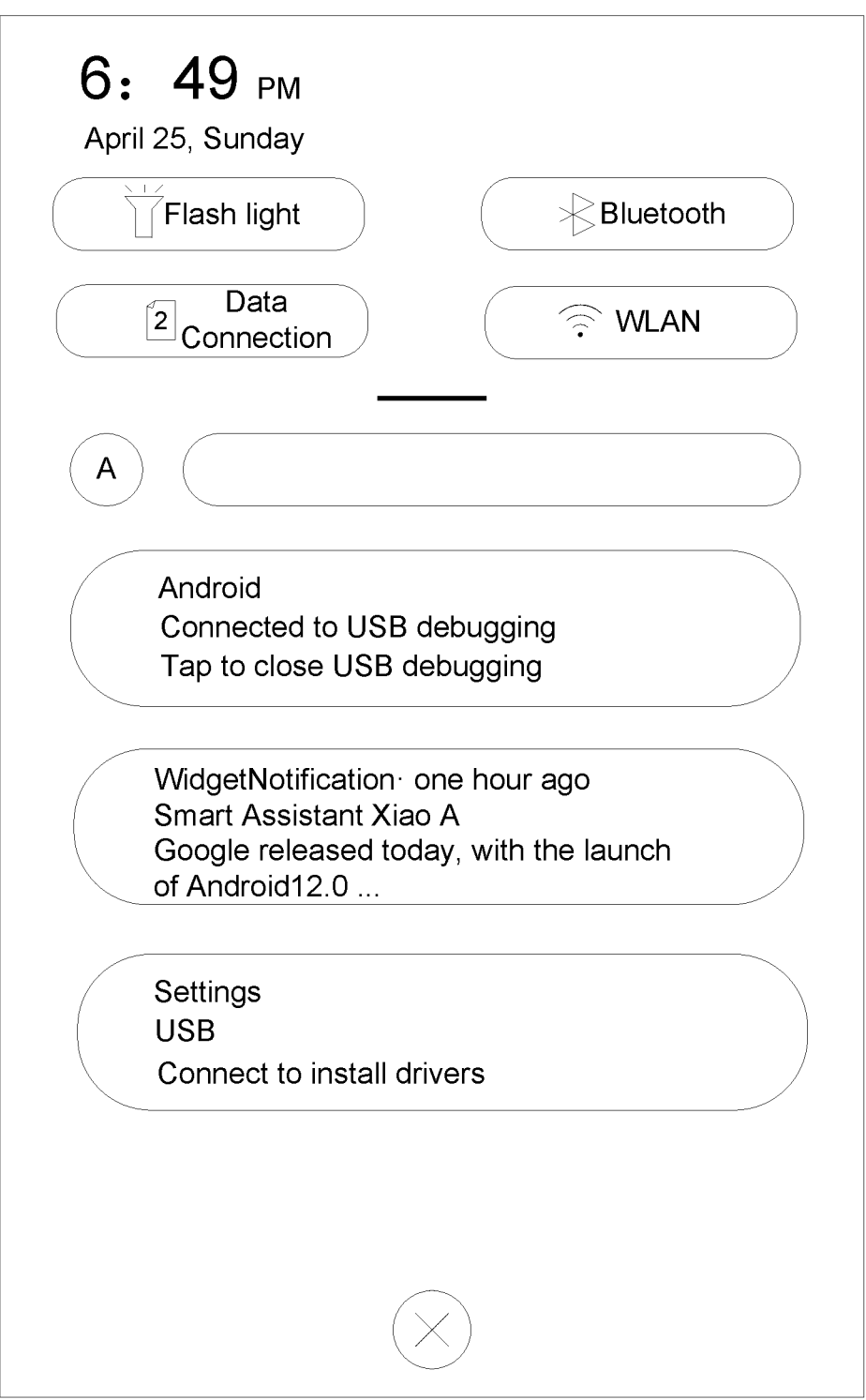
FIG. 10 depicts a schematic diagram showing a display interface of a notification bar process with various elements according to an embodiment of the present disclosure.
Figure 11:
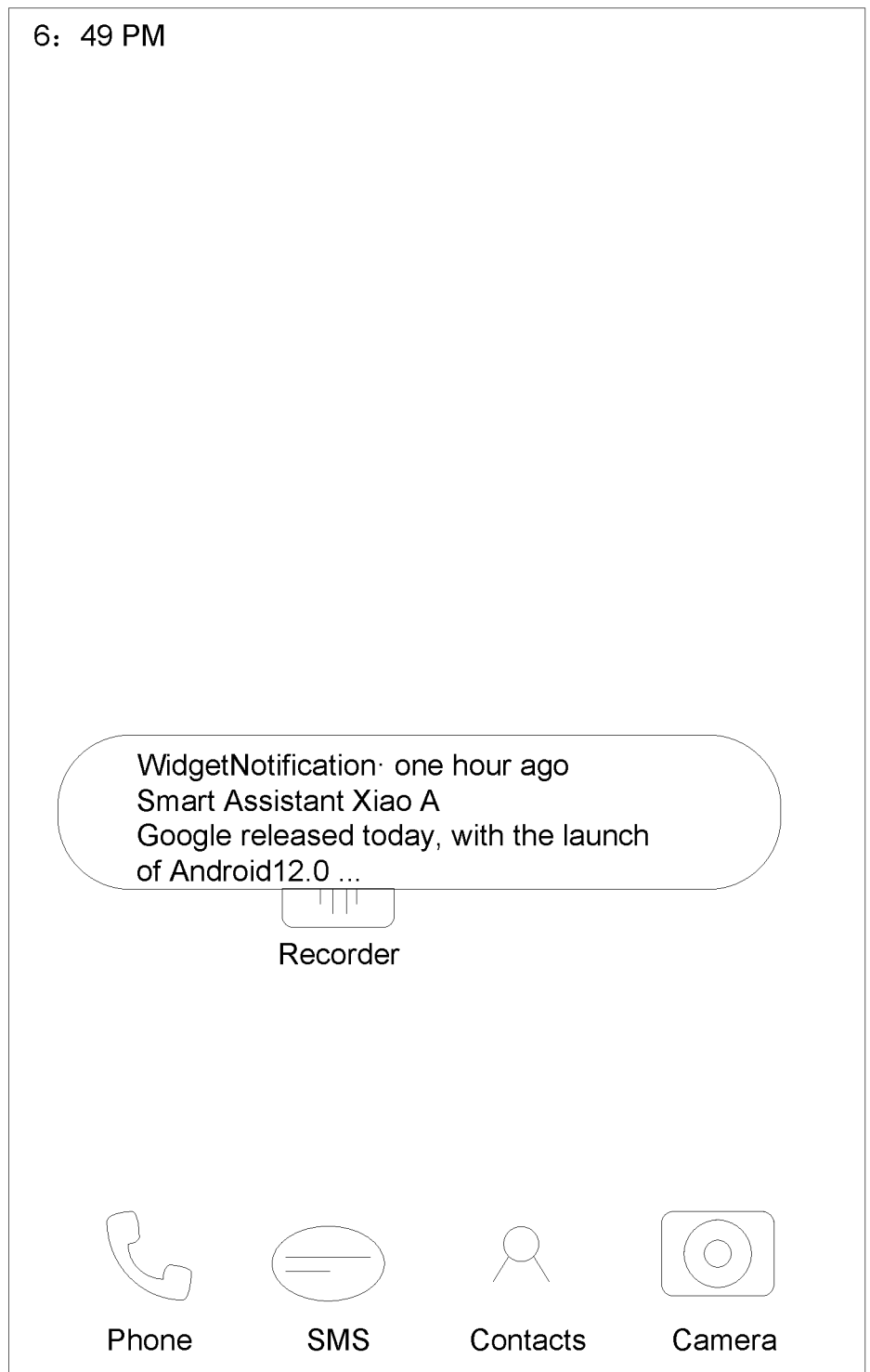
FIG. 11 depicts a schematic diagram of a display interface that displays the target element on a desktop process during the displacement of the target element according to an embodiment of the present disclosure.
Figure 12:
FIG. 12 depicts a schematic diagram showing a display interface that displays the target element on a desktop process after displacing the target element according to an embodiment of the present disclosure.

The contents of the interface displayed by the terminal device can be shown with reference to FIG. 10 to FIG. 12. FIG. 10 depicts a schematic diagram showing a display interface of a notification bar process with various elements according to an embodiment of the present disclosure. FIG. 11 depicts a schematic diagram of a display interface that displays the target element on a desktop process during the displacement of the target element according to an embodiment of the present disclosure. FIG. 12 depicts a schematic diagram showing a display interface that displays the target element on a desktop process after displacing the target element according to an embodiment of the present disclosure.

In particular, with regard to FIG. 11 and FIG. 12, FIG. 11 refers to the schematic diagram showing the display interface in the desktop process on which the target element floats during the drag and displacement of the target element. As can be seen from FIG. 11 that the target element is suspended above an application icon in the desktop process. That is, the target position where the target element is to be placed has been originally occupied by an application icon of a recorder in the desktop process. As such, in an embodiment of the present disclosure, the icon of the recorder application can be displaced to a nearby blank position so that the target element can be displaced and placed at the target position that is desired by the user. As shown in FIG. 12, after the drag and displacement are finished, the icon of the recorder is displaced to a blank position above to leave room for the target element, so that the target element can be placed at the original position of the icon of the recorder, i.e., the target position that is desired by the user. After the placement, the target element is fixedly displayed in the desktop process as a widget.

Based on the above-described method for processing information across processes, several embodiments regarding a controller, a terminal device, and a computer-readable storage medium are provided below.

An embodiment of the present disclosure provides a controller, which includes a memory, a processor, and a computer program stored in the memory and executable by the processor which, when executed by the processor causes the processor to carry out any one of the methods as described above.

It can be understood that the processor and the memory may be connected by a bus or other means.

It should be noted that the controller described in this embodiment can correspond to the system architecture platform in the embodiment shown in FIG. 1, and can constitute a part of the system architecture platform in the embodiment shown in FIG. 1, both of which belong to the same inventive concept, so they have the same principle and beneficial effects, and will not be described in detail here.

Non-transitory software programs and instructions of the method for processing information across processes described in the above embodiments are stored in a memory which, when executed by a processor, causes the processor to carry out operations of the method described above, for example, the above-described operations S100 to S400 described in conjunction with FIGS. 2, S510 to S520 described in conjunction with FIG. 3, S600 described in conjunction with FIG. 4, S700 described in conjunction with FIGS. 5, S810 to S820 described in conjunction with FIG. 6, S900 described in conjunction with FIG. 7, or S1000 described in conjunction with FIG. 8.

It is to be noted that the implementation and corresponding technical effects of the controller in this embodiment of the present disclosure correspond to the embodiments as described with respect to the method for processing information across processes above.

An embodiment of the present disclosure provides a terminal device, which includes but is not limited to the controller as described above.

It can be understood that the terminal device as described above can be, but is not limited to, a mobile phone, a tablet computer, a personal computer, an electronic wearable device, or other terminal device having a screen.

It is to be noted that the implementation and corresponding technical effects of the terminal device in this embodiment of the present disclosure correspond to the embodiments as described with respect to the method for processing information across processes above, due to the controller that is included in the terminal device for implementing the method for processing information across processes.

An embodiment of the present disclosure provides a computer-readable storage medium, which stores computer-executable instructions which, when executed by a processor, causes the processor to carry out the operations of the method described above, for example, the above-described operations S100 to S400 described in conjunction with FIGS. 2, S510 to S520 described in conjunction with FIG. 3, S600 described in conjunction with FIG. 4, S700 described in conjunction with FIGS. 5, S810 to S820 described in conjunction with FIG. 6, S900 described in conjunction with FIG. 7, S1000 described in conjunction with FIG. 8.

The method according to an embodiment of the present disclosure includes, the terminal device first receives an element selection instruction for selection of the target element in the first process shown in the current display interface. Then the terminal device generates a displaceable view that includes the target element according to the element selection instruction. The terminal device switches the current display interface to the target display interface carrying the second process. Eventually, the terminal device receives the view displacement instruction and moves the displaceable view to the second process according to the view displacement instruction. According to the technical scheme of an embodiment of the present disclosure, a user can display various target elements required by the first process altogether in the same second process, so that the user can simply read and find the desired information in the same second process, and the convenience for the user to read and find information is improved.

It shall be appreciated by a person having ordinary skills in the art that all or some of the steps and systems disclosed above can be implemented as software, firmware, hardware and their appropriate combinations. Some or all physical components can be implemented as software executed by a processor, such as a central processing unit, a digital signal processor or a microprocessor, or as hardware, or as an integrated circuit, such as an application-specific integrated circuit. Such software can be distributed on computer-readable media, which can include computer storage media (or non-transitory media) and communication media (or transitory media). As is well known to a person having ordinary skills in the art, the term computer storage medium includes volatile and nonvolatile, removable and non-removable medium implemented in any method or technology for storing information such as computer-readable instructions, data structures, program modules or other data. Computer storage medium includes, but is not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be used to store desired information and accessible by a computer. Furthermore, it is well known to ta person having ordinary skills in the art that communication media usually contains computer-readable instructions, data structures, program modules or other data in modulated data signals such as carrier waves or other transmission mechanisms, and can include any information delivery media.

Described above is a description for several embodiments of the present disclosure, but the present disclosure is not limited to the above embodiments. Those having ordinary skills in the art can make various equivalent modifications or substitutions without departing the scope of the present disclosure, and these equivalent modifications or substitutions are within the scope defined by the claims of the present disclosure.

What is claimed is:

1. A method for processing information across processes, which is applied to a terminal device, the method comprising, receiving an element selection instruction for selection of a target element in a first process in a current display interface;

generating a displaceable view that comprises the target element according to the element selection instruction, wherein the displaceable view is for subsequent displacement and placement;

triggering a second process in response to one of the element selection instruction or an operation trigger instruction, and switching the current display interface to the target display interface carrying the second process; and receiving a view displacement instruction, and displacing the displaceable view into the second process according to the view displacement instruction;

wherein the first process and the second process are different application processes;

the current display interface and the target displace interface are different, such that the first process and the second process are not shown on a same display interface;

when the second process is a desktop process or a lock screen process, the first process is one of a notification bar process, a swipe left screen process, a short message process, a contact information process, or a gallery process; or when the second process is a swipe left screen process, the first process is one of a notification bar process, a short message process, a contact information process, or a gallery process.

2. The method as claimed in claim 1, wherein generating the displaceable view that comprises the target element according to the element selection instruction, comprises, acquiring a current position of the target element according to the element selection instruction; and generating the displaceable view that comprises the target element at the current position.

3. The method as claimed in claim 1, wherein the displaceable view further comprises both screenshot information corresponding to the target element, and data information corresponding to the target element.

4. The method as claimed in claim 1, wherein switching the current display interface to the target display interface carrying the second process comprises, triggering the second process in response to the operation trigger instruction, and switching the current display interface to the target display interface carrying the second process; and triggering the second process in response to the operation trigger instruction and switching the current display interface to the target display interface carrying the second process comprises, receiving the operation trigger instruction that instructs a displacement of the displaceable view; and triggering the second process and switching the current display interface to the target display interface carrying the second process, in response to the displacement of the displaceable view to a preset position in the current display interface.

5. The method as claimed in claim 1, wherein the view displacement instruction carries target position information in the second process, and displacing the displaceable view into the second process according to the view displacement instruction comprises, displacing the displaceable view to a target position corresponding to the target position information, according to the view displacement instruction.

6. The method as claimed in claim 1, wherein displacing the displaceable view into the second process according to the view displacement instruction comprises, displacing the displaceable view into the second process in a floating display mode according to the view displacement instruction, and displaying the displaceable view in the second process as a widget after the view displacement instruction is completed.

7. The method as claimed in claim 1, wherein the second process is one of, a desktop process, a swipe left screen process, or a lock screen process; and when the second process is a desktop process or a lock screen process, the first process is a notification bar process, a swipe left screen process, a short message process, a contact information process, a gallery process, or a third-party application process; and when the second process is a swipe left screen process, the first process is a notification bar process, a short message process, a contact information process, a gallery process, or a third-party application process.

8. The method as claimed in claim 1, wherein the target element comprises at least one of, a text element, a voice element, an image element, or a video element.

9. The method as claimed in claim 1, wherein the element selection instruction comprises one of, a click operation instruction at a target element position, a slide operation instruction at the target element position, a voice operation instruction, a long tap operation instruction issued by a long tap with a duration that exceeds a preset time at the target element position, a click operation instruction at the target element position with a click frequency that exceeds a preset click frequency, or a trigger instruction with a trigger condition that the target element comprises preset keyword information.

10. The method as claimed in claim 1, wherein the view displacement instruction comprises one of, a drag and move instruction, a key-pressing and move instruction, or a voice operation instruction.

11. The method as claimed in claim 2, wherein the second process is one of, a desktop process, a swipe left screen process, or a lock screen process; and when the second process is a desktop process or a lock screen process, the first process is a notification bar process, a swipe left screen process, a short message process, a contact information process, a gallery process, or a third-party application process; and when the second process is a swipe left screen process, the first process is a notification bar process, a short message process, a contact information process, a gallery process, or a third-party application process.

12. The method as claimed in claim 3, wherein the second process is one of, a desktop process, a swipe left screen process, or a lock screen process; and when the second process is a desktop process or a lock screen process, the first process is a notification bar process, a swipe left screen process, a short message process, a contact information process, a gallery process, or a third-party application process; and when the second process is a swipe left screen process, the first process is a notification bar process, a short message process, a contact information process, a gallery process, or a third-party application process.

13. The method as claimed in claim 4, wherein the second process is one of, a desktop process, a swipe left screen process, or a lock screen process; and when the second process is a desktop process or a lock screen process, the first process is a notification bar process, a swipe left screen process, a short message process, a contact information process, a gallery process, or a third-party application process; and when the second process is a swipe left screen process, the first process is a notification bar process, a short message process, a contact information process, a gallery process, or a third-party application process.

14. The method as claimed in claim 5, wherein the second process is one of, a desktop process, a swipe left screen process, or a lock screen process; and when the second process is a desktop process or a lock screen process, the first process is a notification bar process, a swipe left screen process, a short message process, a contact information process, a gallery process, or a third-party application process; and when the second process is a swipe left screen process, the first process is a notification bar process, a short message process, a contact information process, a gallery process, or a third-party application process.

15. The method as claimed in claim 6, wherein the second process is one of, a desktop process, a swipe left screen process, or a lock screen process; and when the second process is a desktop process or a lock screen process, the first process is a notification bar process, a swipe left screen process, a short message process, a contact information process, a gallery process, or a third-party application process; and when the second process is a swipe left screen process, the first process is a notification bar process, a short message process, a contact information process, a gallery process, or a third-party application process.

16. A controller, comprising a memory, a processor, and a computer program stored in the memory and executable by the processor which, when executed by the processor causes the processor to carry out a method for processing information across processes, which is applied to a terminal device, the method comprising, receiving an element selection instruction for selection of a target element in a first process in a current display interface;

generating a displaceable view that comprises the target element according to the element selection instruction, wherein the displaceable view is for subsequent displacement and placement;

triggering a second process in response to one of the element selection instruction or an operation trigger instruction, and switching the current display interface to the target display interface carrying the second process; and receiving a view displacement instruction, and displacing the displaceable view into the second process according to the view displacement instruction;

wherein the first process and the second process are different application processes;

the current display interface and the target displace interface are different, such that the first process and the second process are not shown on a same display interface;

when the second process is a desktop process or a lock screen process, the first process is one of a notification bar process, a swipe left screen process, a short message process, a contact information process, or a gallery process; or when the second process is a swipe left screen process, the first process is one of a notification bar process, a short message process, a contact information process, or a gallery process.

17. A terminal device comprising the controller as claimed in claim 16.

18. A non-transitory computer-readable storage medium storing a computer-executable instruction which, when executed by a processor, causes the processor to carry out a method for processing information across processes, which is applied to a terminal device, the method comprising, receiving an element selection instruction for selection of a target element in a first process in a current display interface;

generating a displaceable view that comprises the target element according to the element selection instruction, wherein the displaceable view is for subsequent displacement and placement;

triggering a second process in response to one of the element selection instruction or an operation trigger instruction, and switching the current display interface to the target display interface carrying the second process; and receiving a view displacement instruction, and displacing the displaceable view into the second process according to the view displacement instruction;

wherein the first process and the second process are different application processes;

the current display interface and the target displace interface are different, such that the first process and the second process are not shown on a same display interface;

when the second process is a desktop process or a lock screen process, the first process is one of a notification bar process, a swipe left screen process, a short message process, a contact information process, or a gallery process; or when the second process is a swipe left screen process, the first process is one of a notification bar process, a short message process, a contact information process, or a gallery process.

* * * * *